United States Patent [19]
Mohammed

[11] Patent Number: 6,041,356

[45] Date of Patent: *Mar. 21, 2000

[54] METHOD AND APPARATUS FOR DETECTING NETWORK TRAFFIC AND INITIATING A DIAL-UP CONNECTION USING SEPARATE UPSTREAM AND DOWNSTREAM DEVICES

[75] Inventor: Mannan Mohammed, Chandler, Ariz.

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/829,584

[22] Filed: Mar. 31, 1997

[51] Int. Cl.$^7$ ............................. G06F 13/00; G06F 3/00; G06F 15/74

[52] U.S. Cl. .................... 709/227; 709/217; 709/219; 709/220; 709/225; 709/228; 709/237; 709/248; 370/389; 370/398; 370/402; 379/45; 379/93.32; 379/230

[58] Field of Search .................... 382/115; 379/45, 379/230, 93.08, 93.32, 93.31; 370/398, 402, 389; 395/651; 340/825.52; 709/227, 220, 248, 225, 228, 237, 238, 250, 231, 219, 217, 203

[56] References Cited

U.S. PATENT DOCUMENTS

| | | | |
|---|---|---|---|
| 5,329,308 | 7/1994 | Binns et al. ......................... | 348/14 |
| 5,818,845 | 10/1998 | Moura et al. ....................... | 370/449 |
| 5,828,655 | 10/1998 | Moura et al. ....................... | 370/236 |
| 5,828,840 | 10/1998 | Cowan et al. ...................... | 395/200.33 |

OTHER PUBLICATIONS

Internetworking with TCP/IP, Principles, Protocols, and Architecture; Comer, Douglas, 3er ed., vol. 1, 1995.

*Primary Examiner*—Frank J. Asta
*Assistant Examiner*—Beatriz Prieto
*Attorney, Agent, or Firm*—Blakely, Sokoloff, Taylor & Zafman LLP

[57] ABSTRACT

In a client having (i) an upstream device driver for controlling an upstream device which sends data to a server; (ii) a downstream device driver for controlling a downstream device which receives data from the server; and (iii) a dialer application for establishing an upstream connection using the upstream device driver, the present invention initiates a connection in response to upstream traffic generated by an application including the steps of receiving the upstream traffic in the downstream device driver; constructing a dial packet in the downstream device driver in response to the upstream traffic; transferring the dial packet from the downstream device driver to the dialer application; and, issuing a call command to the upstream device driver.

12 Claims, 5 Drawing Sheets

DIAL PACKET 112

| DESTINATION MAC ADDRESS | FF-FF-FF-FF-FF-FF |
|---|---|
| SOURCE MAC ADDRESS | 00-AA-00-11-22-33 |
| DESTINATION IP ADDRESS | 255.255.255.255 |
| SOURCE IP ADDRESS | 143.182.12.17 |
| DESTINATION PORT | 01D9 ← 473 (decimal) |
| SOURCE PORT | 0450 |
| PACKET DATA | → 0X64,0X69,0X61, 0X6C,0X00 |

"DIAL" command

*Figure 3*

METHOD AND APPARATUS FOR DETECTING NETWORK TRAFFIC AND INITIATING A DIAL-UP CONNECTION USING SEPARATE UPSTREAM AND DOWNSTREAM DEVICES

BACKGROUND OF THE INVENTION

1. Field of the Invention

The present invention relates to the field of establishing computer networks using cable modems. Specifically, the present invention allows a client, communicating with a server using separate upstream and downstream devices, to detect the presence of upstream traffic and automatically initiate a dial-up connection with the server.

2. Description of Related Art

Currently, most home personal computers (clients) are connecting with the Internet and other on-line services using the public telephone network. Most often, data is transferred using Transmission Control Protocol/Internet Protocol (TCP/IP) implemented over such protocols as the Point-to-Point Protocol (PPP) or Serial Line IP (SLIP). PPP and SLIP allow clients to become part of a TCP/IP network (such as the internet) using the public telephone network and either an analog modem or an Integrated Services Digital Network (ISDN) device. Clients connect to a network by "dialing-up" a Point of Presence (POP), or "headend", server, which then assigns the client an IP address.

The public telephone network has a switched point-to-point architecture and only offers relatively low bandwidth as it was originally designed for analog voice communication. Thus, it does not scale well to the delivery of broadband data such as multimedia. As a result, there are several efforts to create a broadband data delivery infrastructure for client applications. Such an infrastructure, when combined with the increasingly powerful clients that are now available, will enable the delivery of rich multimedia programming to the home.

Broadband data delivery may be accomplished over a variety of different delivery infrastructures. Of these, perhaps the most promising is the infrastructure currently used to deliver cable television. Recent advancements in radio frequency modulation and demodulation technology, along with a large base of cable television subscribers, has made cable television service providers a strong candidate for becoming the preferred provider of broadband services to the home. In the broadband network architecture, a client will be continuously connected to the broadband network and will be in communication with one or more headend servers at all times.

However, as the cable television network was originally intended only for transmitting data from a headend server located at the cable television service provider's site to one or more subscribers/users (i.e., the network was designed for a one-to-many transmission of information), no provision was made for receiving data from the equipment (i.e., clients) located at the users' locations.

A solution has been proposed to achieve two-way communication of data using the existing cable television infrastructure. "Downstream data", defined to be data sent from a headend server to a client, is transferred over coaxial cable from the headend server into the home and to the user's client PC, while "upstream data", defined to be data sent from the client to the headend server, is transferred over the public telephone network. The asymmetrical allocation of upstream/downstream bandwidth is acceptable for most applications as the majority of users requires a larger downstream bandwidth compared to the upstream bandwidth (i.e., most users are "data consumers" rather than "data generators").

In operation, downstream data is received by a client using a "one-way" cable modem while upstream data is transmitted by an analog modem or an ISDN device, over the public telephone network, to the headend server via a Plain old Telephone Service (POTS) server at the headend office. The POTS server forwards any upstream data sent by the client to the headend server for appropriate action (e.g., providing domain name server (DNS) services, simple mail transfer protocol (SMTP) services, gateway or proxy services, etc.).

The client and the headend server communicate using TCP/IP. Data is transmitted in packets, where packets are defined as a block of data with appropriate transmission data attached in the form of a header and footer to be sent or received over a network. Downstream and upstream data are sent using the ethernet standard, as defined by the Institute of Electrical and Electronics Engineers (IEEE) 802.3, modulated for transmission over: (1) coaxial cable using the cable modem; or, (2) a telephone line using the analog modem or the ISDN device and PPP or SLIP protocols.

In order for the client to use the cable modem for communication, the cable-modem is installed as an Ethernet adapter in the client, and the client is configured just as an ordinary TCP/IP network machine. After the initial configuration and initialization of the cable modem, data would come from the headend server over the coaxial cable in the cable network.

In addition to having separate devices for upstream and downstream data transfers, a client will be said to be "multi-homed" in that the client's upstream device and its downstream device will both have different IP addresses as the upstream device (i.e., the analog modem or ISDN device), will be assigned an IP address in addition to the IP address already assigned to the cable modem. In the multi-homed environment, all upstream data will be sent to the IP address of the upstream device while all downstream data will be received from the IP address of the downstream device.

Before multi-homing of the client's TCP/IP stack takes place, all packets (data frames) being sent by the client will be delivered to the downstream device (i.e., the cable modem) for transmission to the headend server. However, as the cable modem does not support transmission of upstream data, the cable modem cannot transmit the packets, and as a result, the packets are lost. After multi-homing of the client's TCP/IP stack takes place, upstream data will be sent using the upstream device (i.e., the analog modem on ISDN device) while downstream data will still be received over the cable modem.

Currently, in order for the client to become multi-homed and capable of sending data back to the headend server, a user would need to manually "dial-up" (i.e., the user has to initiate a connection to) the headend server using functions such as those provided by the Remote Access Services (RAS) library provided by Microsoft® Corporation in its Windows NT® and Windows 95® operating systems. Once the connection is established, the TCP/IP stack becomes multi-homed and any data that needs to go upstream would go over the public telephone network while any data that needs to come downstream still comes over the coaxial cable.

Although attempts have been made to provide for the automatic initiation of an upstream connection (i.e., the initiation of a dial-up of the headend server) to establish multi-homing of the client and the establishment of an upstream data path, most of the attempts have been proprietary to specific applications and are not available to all applications in a transparent and efficient manner.

Therefore, a solution needs to be provided for the above-identified situation where a client PC has a dial-up for separate upstream traffic and it is desired that whenever the user launches any network application, the upstream connection is established automatically, without any user intervention.

SUMMARY OF THE INVENTION

In a client having (i) an upstream device driver for controlling an upstream device which sends data to a server; (ii) a downstream device driver for controlling a downstream device which receives data from the server; and (iii) a dialer application for establishing an upstream connection using the upstream device driver, the present invention initiates a connection in response to upstream traffic generated by an application including the steps of receiving the upstream traffic in the downstream device driver; constructing a dial packet in the downstream device driver in response to the upstream traffic; transferring the dial packet from the downstream device driver to the dialer application; and, issuing a call command to the upstream device driver.

Other features and advantages of the invention will be apparent from the accompanying drawings, and from the detailed description that follows below.

BRIEF DESCRIPTION OF THE DRAWINGS

FIG. 3 is a diagram of a data packet configured in accordance with the preferred embodiment of the present invention;

DETAILED DESCRIPTION OF THE INVENTION

The present invention provides a method and apparatus for detecting network traffic and initiating a dial-up connection. For purposes of explanation, specific embodiments are set forth to provide a thorough understanding of the present invention. However, it will be understood by one skilled in the art, from reading this disclosure, that the invention may be practiced without these details. Further, although the present invention is described through the use of a one-way asymmetric cable modem network, most, if not all, aspects of the invention apply to all networks in general. Moreover, well-known elements, devices, process steps and the like are not set forth in detail in order to avoid obscuring the present invention.

Figure 1:
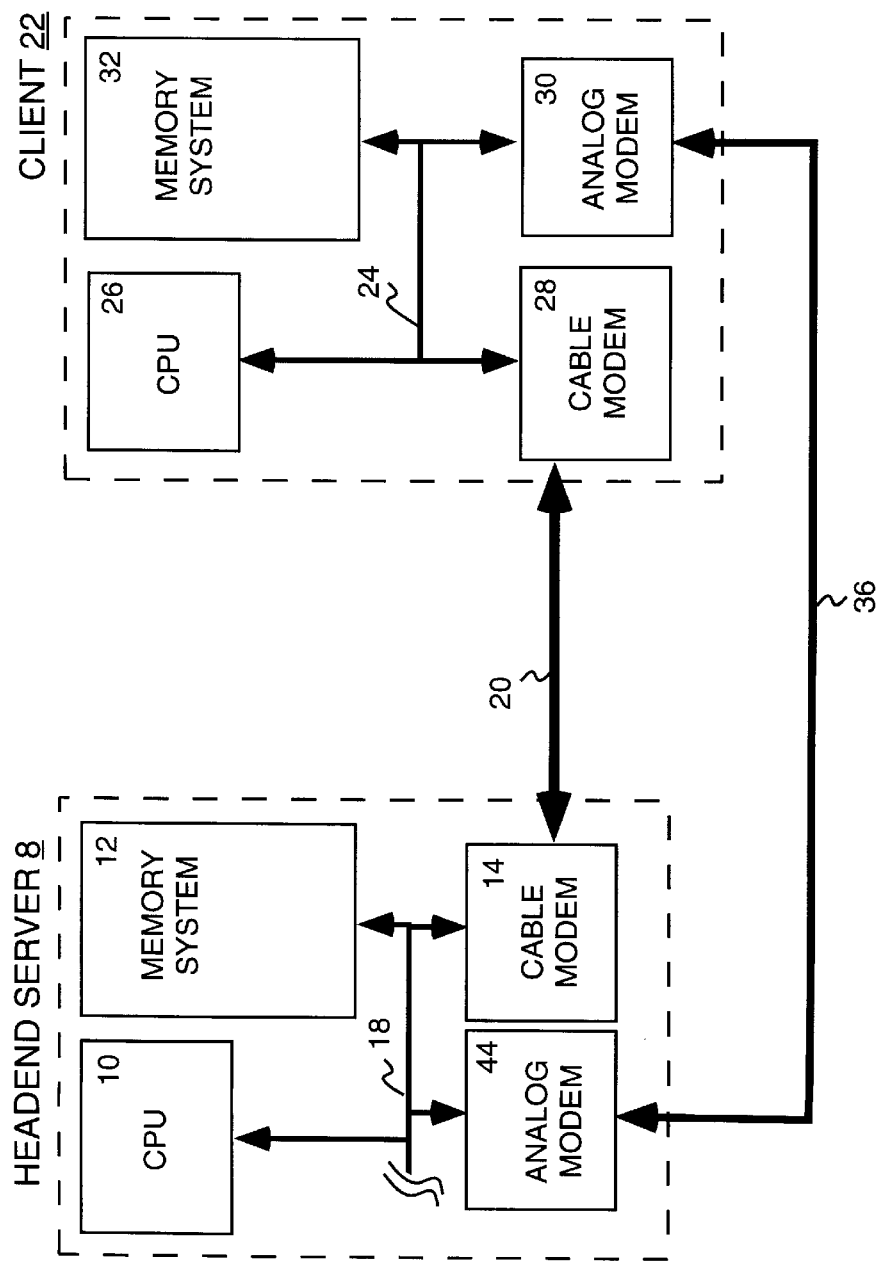
FIG. 1 is a block diagram of a computer network with a client and a server configured in accordance with a preferred embodiment of the present invention.

FIG. 1 is a block diagram of a system configured in accordance with a preferred embodiment of the present invention. In FIG. 1, headend server 8 has a CPU 10, a memory system 12, a cable modem 14 and an analog modem 44 communicating with each other over bus 18. Headend server 8 provides high-speed data services and can offer access to the internet and proprietary networks through the use of special interfaces (not shown).

Also in FIG. 1 is a client 22 which includes a bus 24 to which a CPU 26, a cable modem 28 and an analog modem 30 are connected. A memory system 32 is also connected to bus 24. Memory system 32 may be solely random access memory or a combination of random access memory and other, non-volatile, data storage units such as read-only memory or magnetic disk media. Memory system 32 has a client daemon 34 stored in it which cooperate with CPU 26 to provide the desired results. Client 22 is coupled to and communicates with headend server 8 through the use of cable 20.

Client 22 is connected and sends data to headend server 8 through the use of analog modem 30 and a telephone line 36. Headend server 8 receives data from client 22 using analog modem 44. As explained below, headend server 8 communicates with client 22 using a communication protocol such as the Transmission Control Protocol/Internet Protocol (TCP/IP). This protocol allows the performance of a large number of functions including packetizing data by attaching a header and footer to a block of data to be transmitted over a network and setting up a two-way connection between headend server 8 and client 22. Thus, both headend server 8 and client 22 are configured as ordinary TCP/IP network machines.

In operation, data packets are assembled by headend server 8 and sent to cable modem 14, which transmits the data packets to client 22 on cable 20. Cable modem 14 includes an ethernet adapter which supports the ethernet standard as defined by the Institute of Electrical and Electronics Engineers (IEEE) 802.3. In addition, cable modem 14 is responsible for transmitting ethernet packets over cable 20. Some packets are intended to be received by all clients while other packets are targeted for one or more specific clients.

It is to be noted that the functions performed by headend server 8 to transmit and receive the data over cable 20 and telephone line 36 can be divided between one or more servers. For example, a separate server can be used only to handle the communication of data over telephone line 36 while leaving headend server 8 to handle only the communication of data over cable 20.

Memory system 32 of client 22 has various software elements stored in it that cooperate with CPU 26 to provide desired results. These software elements, shown in FIG. 2, include an operating system. As detailed below, in one embodiment, the operating system includes a transport stack layer. The transport stack layer includes a TCP/IP layer and a network driver interface layer. In other embodiments, these layers can be added onto the operating system. Layers are logical divisions in a computer system among its hardware and software functional components.

The TCP/IP layer enables client 22 to receive and send data on a TCP/IP network, such as the Internet. The TCP/IP layer surrounds data passed from upper layers in client 22 with header information before sending the data to other layers in the communication subsystem of client 22.

The network driver interface layer provides communication between the transport layer and a network driver (also referred to as a device driver). Examples of network driver interface layers include the Open Data-Link Interface ("ODI") layer from Novell, Inc., and the Network Driver Interface Specification ("NDIS") layer from Microsoft® Corporation.

In one embodiment, the operating system is Windows 95® or Windows NT® from Microsoft® Corporation. Both of these operating systems include a transport stack which includes a TCP/IP layer and an NDIS layer. Further information about the NDIS layer is disclosed, for example, in a CD-ROM from Microsoft® Corporation entitled *Microsoft® Developer's Network Library* (1996), incorporated herein by reference, and in Dhawan, Sanjay, *Networking Device Drivers*, ch. 5,pp. 197–231, Van Noscrand Reinhold (1995), also incorporated herein by reference.

Device drivers that interface with an NDIS layer are referred to as "miniport" drivers. Miniport drivers are positioned between the NDIS layer and a network controller.

Other software elements stored within client 22 include application programs and, in one embodiment of the present invention, interface software that includes routines that perform the function of a cable modem interface unit. The interface software, when used with an NDIS layer, is implemented as a miniport driver.

In the preferred embodiment, cable modem 28 is installed as an internal card which interfaces to bus 24 of client 22. For example, bus 24 can be a bus which conforms to the Peripheral Component Interconnect (PCI) standard and cable modem 28 can be contained on a card which would interface with PCI busses. Similar to cable modem 14, cable modem 28 includes an ethernet adapter which supports the ethernet standard as defined by IEEE 802.3. Cable modem 28 is also responsible for transmitting the ethernet packets from client 22 to headend server 8 over cable 20.

Thus, after the initial configuration and initialization of cable modem 14, downstream data would come to client 22 from headend server 8 over cable 20. However, in order for client 22 to send data back to headend server 8, an upstream connection would need to be initiated with headend server 8. Once the connection is established, the TCP/IP stack contained on client 22 becomes multi-homed (i.e. client 22 would have two IP addresses—one for analog modem 30 and one for cable modem 28), and any data that need to go upstream (i.e. to headend server 8) would go over telephone line 36 while any data that needs to come downstream is still transmitted over cable 20.

Figure 2:
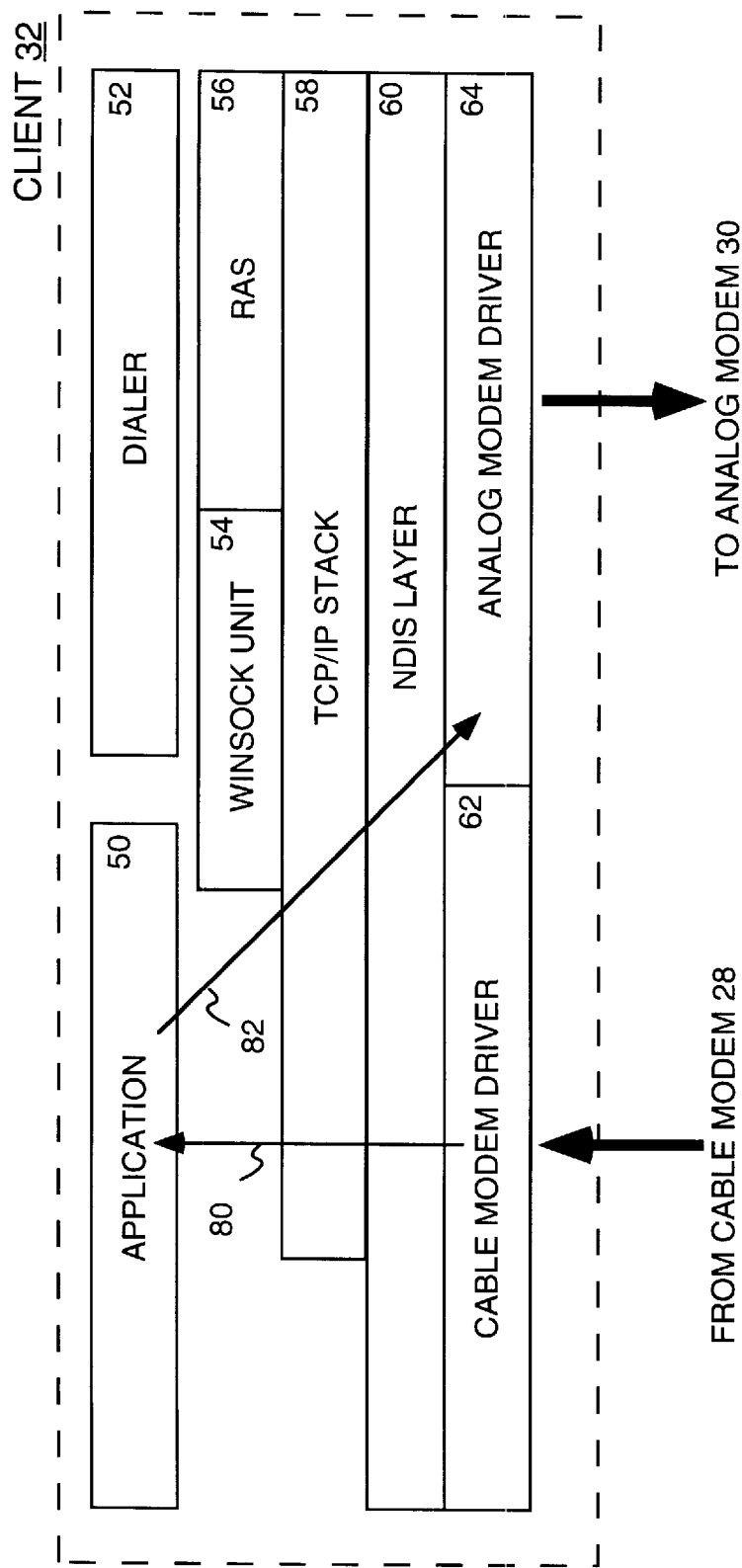
FIG. 2 is a block diagram of a memory system of the client configured in accordance with the preferred embodiment of the present invention.

FIG. 2 illustrates the content of memory system 32 of client 22 containing an application 50, a dialer 52, a winsock unit 54, a remote access services (RAS) library 56, a TCP/IP stack 58, a network driver interface specification (NDIS) layer 60, a cable modem driver 62, and an analog modem driver 64.

Application 50 is an application program run by client 22. An example of an application program is an Internet Web browser that is used to view data received from the Internet and initiate requests of data from the Internet.

Dialer 52, along with RAS library 56 and analog modem driver 64, is used to initiate an upstream connection with headend server 8. Dialer 52 is a daemon application which is resident in memory system 32 and performs the functions necessary to cause analog modem 30 to dial headend server 8. In the preferred embodiment, dialer 52 uses the RAS-DIAL API library under Windows 95® to initiate a dial-up connection.

Winsock unit 54 is used as an interface to TCP/IP stack 58, and provides an application program interface (API) for application programs such as application 50 to access TCP/IP stack 58. Winsock unit 54 also contains a listing of the port numbers that are being used and the sockets which are bound to those port numbers.

As discussed above, TCP/IP stack 58 performs the functions required when communicating with a TCP/IP network such as the Internet. NDIS layer 60 provides the interface between the network protocol and the network driver. In one embodiment of the present invention, when Windows 95® or Windows NT® are used as the operating system of client 22, and TCP/IP stack 58 and NDIS layer 60 are included with the operating system.

Cable modem driver 62 and analog modem driver 64 are specific to cable modem 28 and analog modem 30, respectively. They are used to initialize, configure and control cable modem 28 and analog modem 30, respectively, and are loaded at system boot time. In alternate embodiments, the functions of cable modem driver 62 and analog modem driver 64 can be implemented by one module or more than one modules.

Analog modem driver 64 is the software controller for analog modem 30 and provides access to the functions provided by analog modem 30. Thus, analog modem driver 64 is used to communicate with analog modem 30, which in turn is used to communicate with analog modem 44 of headend server 8. In the preferred embodiment, analog modem 30 and analog modem 44 are standard modems configured to work with the public switch telephone network. In an alternate embodiment, adapters transmitting signals using digital technologies such as ISDN can be used. It is also to be noted that any network/medium can be used to provide the upstream connection from client 22 to headend server 8, in addition to analog modems or ISDN adapters. Thus, even adapters which use wireless communications technology can also be used.

When a packet is received by client 22 using cable modem 28, it is passed on to cable modem driver 62. Cable modem driver 62 in turn transfers the packet onto TCP/IP stack 58. In TCP/IP stack 58, the packet is checked for errors, stripped of its header and footer and passed on to application 50. The direction of travel of downstream traffic is illustrated by arrow 80 in FIG. 2.

Conversely, the direction of travel of upstream traffic is illustrated by arrow 82, where the data generated by application 50 is sent to analog modem driver 64 for transmission by analog modem 30 to analog modem 44. Thus, application 50 would generate a packet which would be sent to TCP/IP stack 58, which would place the proper header and footer on the packet before sending it to analog modem driver 64.

In this invention, cable modem driver 62 is modified to generate a "pre-fabricated" packet to initiate the upstream connection to headend server 8 when cable modem driver 62 receives upstream traffic to transmit. In the preferred embodiment, the packet is constructed using the User Datagram Protocol (UDP) and is directed at a known good port in TCP/IP stack 58. Specifically, the packet is transmitted to the known good port which is monitored by dialer 52. In the preferred embodiment, this port is port number 473. The contents of the packet indicate that the packet is being sent to the known good port (e.g., Port #473 ) and also contain a set of pre-defined data. An example packet contains the following fields:

Source Port=0405 /* Or some other port */
Destination Port=01D9 / * Or some other known good port */
Source Mac=00-AA-00-11-22-33 /* Any source Mac address */
Destination Mac=FF-FF-FF-FF-FF-FF /* Broadcasted MAC */

Destination IP Address=256.256.256.256 /* Broadcasted IP */
Source IP Address=143.182.12.17 /* Any source IP Address */
Packet Data="DIAL" /* Any data as defined in protocols */

It is to be noted that although cable modem 28 also has an IP address, this Ip address is not used. Therefore, only the IP address of analog modem 30 (the upstream device of client 22) and the MAC address of cable modem 28 (the downstream device of client 22) will be used.

FIG. 3 contains a diagram of a DIAL packet 112 configured in accordance with the preferred embodiment of the present invention.

As discussed above, DIAL packet 112 is a UDP packet. DIAL packet 112 contains the following fields: a destination MAC address; a source MAC address; a destination IP address; a source IP address; a destination port; a source port; and a packet data.

The destination MAC and IF addresses are the MAC and IP addresses of POTS server 38, respectively. In FIG. 3, for sake of simplicity, the destination MAC address of headend server 8 is a broadcast ethernet address FF-FF-FF-FF-FF-FF while the destination IP address of headend 8is a broadcast IP address 256.256.256.256.

The source MAC and IP addresses are the MAC and IP addresses of analog modem 30. In FIG. 3, the source MAC address of analog modem 30 is 00-AA-00-11-22-33 while the source IP address of analog modem 30 is 143.182.12.17.

The destination port field contains the hexadecimal equivalent of decimal number 473,which, as discussed above, is the known good port used in the preferred embodiment of the present invention. In the preferred embodiment. the source port field is not important as only the destination port field is needed to send dial packet 112 to dialer application 52.

The packet data field contains what is used to cause dialer 52 to initiate a connection with headend server 8. In the preferred embodiment, the packet data field would contain a string like "DIAL" which represents a DIAL command to the control application.

In the preferred embodiment, the data structures for DIAL packet 112 can be implemented in a programming language such as "C". For example, the typedef for DIAL packet 112 would be:

```
typedef client dial {
    char    Mac_header[14];
    char    IP_header[20];
    char    TCP_header[20];
    char    Data[5];
} DIAL;
```

Figure 4:
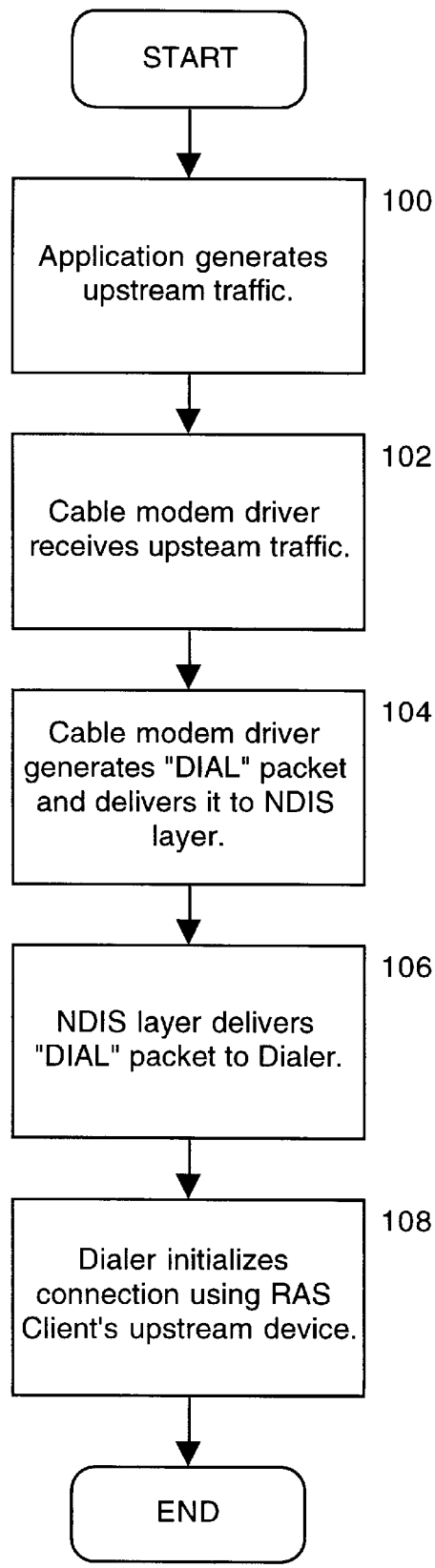
FIG. 4 is a flow diagram of the operation of a driver contained in the memory system of the client in the computer network for initiating a connection with the server in accordance with the preferred embodiment of the present invention.

FIG. 4 is a flow diagram of the sequence of steps involved in setting up an upstream connection in the preferred embodiment of the present invention. Discussion of FIG. 4 will also involve the use of FIGS. 1–3. Before this sequence initiates, no upstream connection has been initiated. However, client 22 has been powered-up and all necessary software is contained in memory system 32. TCP/IP stack 58 also only contains the TCP/IP address of cable modem 28—i.e., TCP/IP stack 58 is not multi-homed.

In block 100, application 50 generates upstream traffic a consisting of a set of packets. In block 102,these packets are sent to cable modem driver 62 for transmission to headend server 8 through the use of cable modem 28. As cable modem 28 cannot transmit data upstream but is only capable of receiving downstream data, these packets are lost. Although, TCP/IP stack 58 will retransmit these packets after a predetermined period of time as a default function, then packets will also be lost. Operation would continue with block 104.

In block 104, the cable modem driver 62, in response to the received packet, generates pre-fabricated DIAL packet 112 and delivers it to NDIS layer 60.

In block 106, NDIS layer 60 examines DIAL packet 112, and delivers it to the UDP socket bound to the port number specified in the "destination port" field of DIAL packet 112.

In block 108, dialer 52 receives the packet and initiates a connection using RAS layer 56. To initiate the connection, analog modem 30 communicates with headend server 8 over telephone line 36 through the use of analog modem 44 of headend server 8. Headend server 38 will assign analog modem 30 an IP address using a protocol such as the Dynamic Host configuration Protocol (DHCP). In an alternate embodiment, analog modem 30 could receive a static IP address in a similar fashion to cable modem 28.

Once the upstream connection from client 22 to headend server 8 is established, upstream traffic is sent using analog modem 30 and downstream traffic is received using cable modem 28. Thus, TCP/IP stack 58,becoming multi-homed after client 22 and headend server 8 completes network set-up, delivers data to be transmitted to headend server 8using analog modem driver 64. At this stage, the data is packetized and sent using analog modem 30 (i.e., the upstream device), over telephone line 36, to analog modem 44 of headend server 8.

Thus, as soon as any network traffic is generated by application 50, cable modem driver 62 receives the set of packets and, instead of attempting to transmit the set of packets using cable modem 28—which would discard the set of packets as cable modem 28 is not capable of upstream transmission—cable modem driver 62 sends a DIAL packet to the known good port via NDIS layer 60 and TCP/IP stack 58. Dialer 52, which monitors the known good port for any arriving packets, would receive this DIAL packet and initiate the RAS connection that establishes an upstream connection with headend server 8. As soon as the upstream connection is established, TCP/IP stack 58 is multi-homed and the upstream data will go over analog modem 30 while downstream data will come over cable modem 28.

The present invention provides autodialing capability for all network applications (e.g., browsers, legacy 16-bit applications, games, etc.) and the ability to set up transparent connections on one-way cable modems. Presently, network applications have auto set-up capability which is limited only to that particular application. Thus, for all applications to have the auto set-up capability, a lower layer driver needs to provide it. Hence, cable modem driver 62 (as it is the lowest layer of software), can provide the autodial functionality to all applications.

In the present invention, cable modem driver 62 initiates the upstream connection as opposed to the connection being initiated by other applications. Once an upstream connection is established, cable modem driver 62 would not receive any upstream traffic, and thus, would not send DIAL packet 112. However, if the upstream connection is dropped, either due to a timeout from inactivity or a reset of the upstream connection by the user, then the next time any upstream data is generated, it will be sent to cable modem driver 62. Cable modem driver 62 will then send DIAL packet 112 to NDIS layer 60, as described above.

Figure 5:
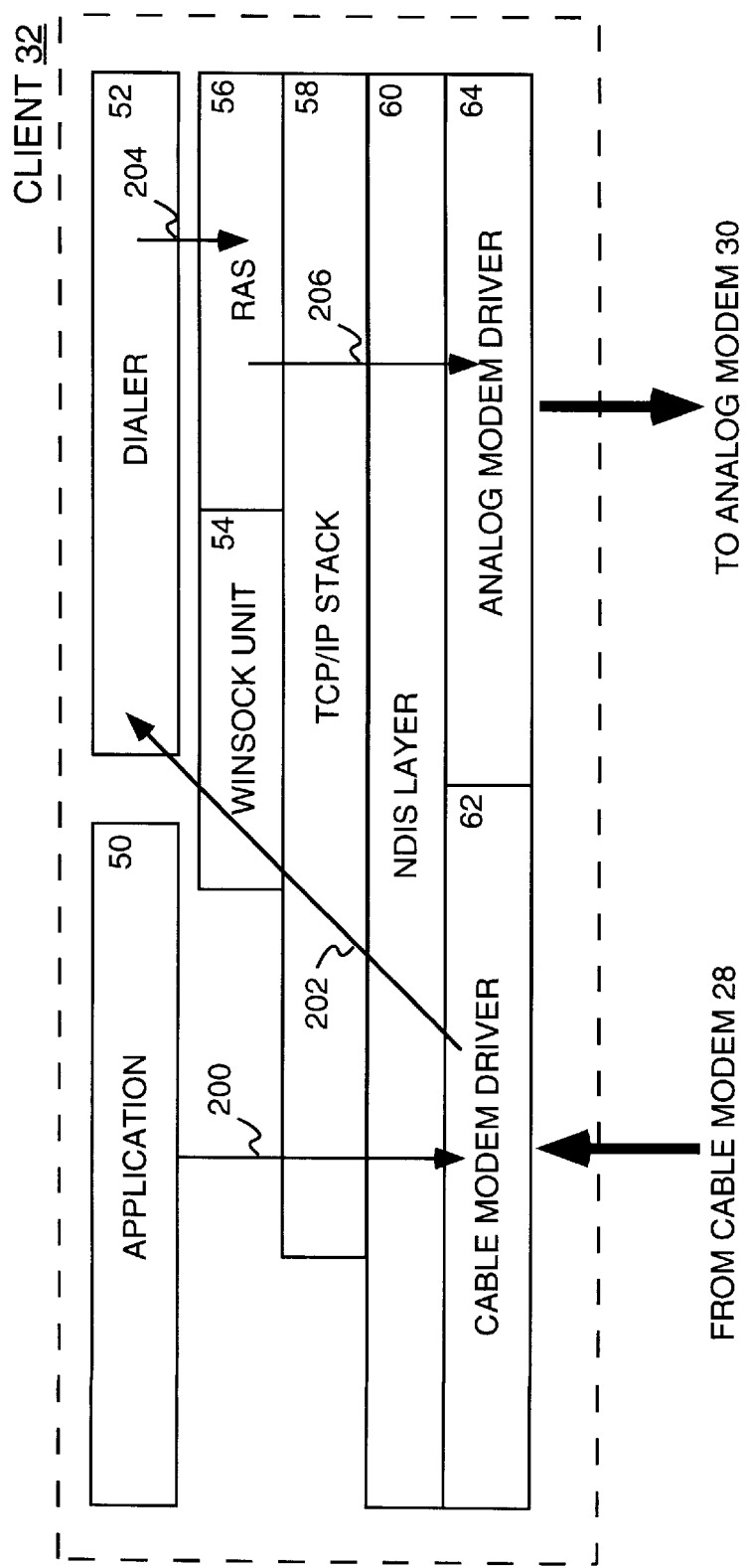
FIG. 5 is a diagram illustrating the operation of the driver in response to upstream traffic generated by an application contained in the memory system of the client.

FIG. 5 is illustrates the operation of the driver in response to upstream traffic generated by an application contained in the memory system of the client. Specifically, arrow 200 in FIG. 5 illustrates the travel of upstream traffic generated by application 50 to TCP/IP stack 58. As no upstream connection is in place—i.e., no connection has been achieved between client 32 and headend server 8—TCP/IP stack 58 only contains the TCP/IP connection of cable modem driver 62. Upstream traffic will thus be sent to cable modem driver 62.

As described above, cable modem driver 62 will generate DIAL packet 112 in response to receiving upstream traffic and send it to the known good port monitored by dialer 52. The direction of travel of DIAL packet 112 is indicated by arrow 202.

Dialer 52, upon receipt of DIAL packet 112, will then initiate a dial-up request using RAS library 56. This is indicated by arrow 204.

RAS library 56 will function to initiate the upstream connection through analog modem driver 64, as indicated by arrow 206 in FIG. 5.

After the upstream connection has been achieved, operation would continue as described above, where upstream traffic would be directed to analog modem driver 64, while downstream traffice would be received from cable modem driver 62.

While the present invention has been particularly described with reference to the various figures, it should be understood that the figures are for illustration only and should not be taken as limiting the scope of the invention. Many changes and modifications may be made to the invention, by one having ordinary skill in the art, without departing from the spirit and scope of the invention.

What is claimed is:

1. In a client having (i) an upstream device driver for controlling an upstream device which sends data to a server; (ii) a downstream device driver for controlling a downstream device which receives data from said server, said upstream device driver and said downstream device driver being separate drivers for separate devices; and (iii) a dialer application for establishing an upstream connection using said upstream device driver, a method for initiating a connection with said server in response to upstream traffic generated by an application in said client comprising the steps of:

receiving said upstream traffic in said downstream device driver, said downstream device driver being incapable of transmitting said upstream traffic;

constructing a dial packet in said downstream device driver in response to said upstream traffic;

transferring said dial packet from said downstream device driver to said dialer application; and, issuing a call command to said upstream device driver.

2. The method of claim 1, wherein said dial packet contains a destination port field and a data field, and said dial packet constructing step comprises the steps of:

placing a predetermined port value into said destination port field; and, placing a DIAL command in said data field.

3. The method of claim 2, wherein said transferring step comprises the step of:

extracting said predetermined port value from said destination port field of said dial packet; and determining if said predetermined port value belongs to said dialer application; and, transferring said dial packet to said dialer application.

4. The method of claim 1, wherein said call command is an application programming interface command.

5. A client including:

a client processor;

an upstream device coupled to said client processor, said upstream device for sending and receiving data from a server;

a downstream device coupled to said client processor, said downstream device being a separate device from said upstream device for receiving data from said server and incapable of sending data to said server; and, client memory coupled to said client processor having (i) an upstream device driver for controlling said upstream device; (ii) a downstream device driver for controlling said downstream device; and (iii) a dialer application for establishing an upstream connection with said server using said upstream device driver in response to upstream traffic generated by an application in said client; wherein said client memory is configured to enable said client processor to:

receiving said upstream traffic in said downstream device driver;

constructing a dial packet in said downstream device driver in response to said upstream traffic;

transferring said dial packet from said downstream device driver to said dialer application; and, issuing a call command to said upstream device driver.

6. The client of claim 5, wherein said dial packet contains a destination port field and a data field, and said client memory is further configured to enable said client processor to:

place a predetermined port value into said destination port field; and, place a DIAL command in said data field.

7. The client of claim 6, wherein said client memory is further configured to enable said client processor to:

extracting said predetermined port value from said destination port field of said dial packet; and determining if said predetermined port value belongs to said dialer application; and, transferring said dial packet to said dialer application.

8. The client of claim 5, wherein said call command is an application programming interface command.

9. A system comprising:

a server; and a client coupled to said server, said client including:

a client processor;

an upstream device coupled to said client processor, said upstream device for sending and receiving data from said server;

a downstream device coupled to said client processor, said downstream device being a separate device from said upstream device for receiving data from said server and incapable of sending data to said server; and, client memory coupled to said client processor having (i) an upstream device driver for controlling said upstream device; (ii) a downstream device driver for controlling said downstream device; and (iii) a dialer application for establishing an upstream connection with said server using said upstream device driver in response to upstream traffic generated by an application in said client; wherein said client memory is configured to enable said client processor to:

receiving said upstream traffic in said downstream device driver;

constructing a dial packet in said downstream device driver in response to said upstream traffic;

transferring said dial packet from said downstream device driver to said dialer application; and, issuing a call command to said upstream device driver.

10. The system of claim 9, wherein said dial packet contains a destination port field and a data field, and said client memory is further configured to enable said client processor to:

place a predetermined port value into said destination port field; and, place a DIAL command in said data field.

11. The system of claim 10, wherein said client memory is further configured to enable said client processor to:

extracting said predetermined port value from said destination port field of said dial packet; and determining if said predetermined port value belongs to said dialer application; and, transferring said dial packet to said dialer application.

12. The system of claim 9, wherein said call command is an application programming interface command.

* * * * *

UNITED STATES PATENT AND TRADEMARK OFFICE
CERTIFICATE OF CORRECTION

PATENT NO. : 6,041,356
DATED : March 21, 2000
INVENTOR(S) : Mohammed

It is certified that error appears in the above-identified patent and that said Letters Patent is hereby corrected as shown below:

In column 7, at line 20, delete "IF" and insert --IP--.

In column 7, at line 64, delete "a".

Signed and Sealed this

Seventeenth Day of April, 2001

Attest:

NICHOLAS P. GODICI

*Attesting Officer*    *Acting Director of the United States Patent and Trademark Office*